United States Patent [19]

Simmons

[11] E Re. 31,142

Best Available Copy [45] Reissued Feb. 8, 1983

[54] ELECTRICAL TAB RECEPTACLE

[75] Inventor: Reginald J. Simmons, South Harrow, England

[73] Assignee: AMP Incorporated, Harrisburg, Pa.

[21] Appl. No.: 208,714

[22] Filed: Nov. 20, 1980

Related U.S. Patent Documents

Reissue of:

[64] Patent No.: Re. 30,277
Issued: May 20, 1980
Appl. No.: 876,584
Filed: Feb. 10, 1978

Which Is a Reissue of:

[64] Patent No.: 3,976,348
Issued: Aug. 24, 1976
Appl. No.: 572,500
Filed: Apr. 28, 1975

[30] Foreign Application Priority Data

May 3, 1974 [GB] United Kingdom ..... 19542/74

[51] Int. Cl.[3] ..... H01R 13/62
[52] U.S. Cl. ..... 339/74 R; 339/258 S

[58] Field of Search ..... 339/47–49, 339/74, 256 SP, 258 S

[56] References Cited

U.S. PATENT DOCUMENTS

| | | | |
|---|---|---|---|
| 1,812,153 | 6/1931 | Jones | 339/74 R |
| 2,682,038 | 6/1954 | Johnson | 339/258 S |
| 2,682,040 | 6/1954 | Batcheller | 339/258 S |
| 3,065,448 | 11/1962 | Hopkins et al. | 339/258 S |
| 3,188,600 | 6/1965 | Woofter et al. | 339/47 R |
| 3,373,398 | 3/1968 | Volinskie | 339/217 S |
| 3,550,069 | 12/1970 | Teagno | 339/256 SP |
| 3,644,872 | 2/1972 | Russo, Jr. | 339/47 R |
| 3,796,987 | 3/1974 | Kinkaid et al. | 339/217 S |
| 3,873,174 | 3/1975 | Horecky et al. | 339/95 D |

*Primary Examiner*—Joseph H. McGlynn
*Attorney, Agent, or Firm*—Allan B. Osborne

[57] ABSTRACT

An electrical tab receptacle for mating with a complementary tab is provided with an integral tongue having a lance whereby the receptacle can be releasably secured to the tab, the tongue being resiliently depressible by means of a finger, a tool, or part of a housing containing the receptacle, to release the receptacle from the tongue.

18 Claims, 5 Drawing Figures

ELECTRICAL TAB RECEPTACLE

Matter enclosed in heavy brackets [ ] appears in the original patent but forms no part of the first and this reissue specification; matter printed in italics indicates the additions made by the first reissue. Matter enclosed in double heavy brackets [[ ]] appears in the first reissue patent but forms no part of this reissue specification; matter printed in bold face indicates the additions made by this reissue.

The invention relates to an electrical tab receptacle.

Receptacles of this general description are well-known in various forms, for example as described in U.K. Patent Specification Nos. 777,677 and 793,654.

Such receptacles may be releasably engaged with a complementary tab in an exposed arrangement, or may be mounted in an insulating housing either singly, or as a group for simultaneous connection to a plurality of complementary tabs.

Such tab and receptacle connectors have in the past fifteen years formed the principal means of connecting harness wiring in consumer goods and the automotive industry.

In more recent years there has been an increasing demand for increased reliability of electrical connectors due to high maintenance and warranty liabilities of consumer goods and automotive manufacturers. There is thus a demand for a tab receptacle which can be used in the conventional manner but which is less susceptible to inadvertent disconnection from a complementary tab due, for example, to vibration or mishandling, but which can nevertheless be easily disconnected when required.

An electrical tab receptacle according to the invention is formed from sheet metal and comprises a generally channel-shaped receptacle portion having a base and upstanding side walls with free edge portions of the side walls turned in over the base for receiving a complementary tab between the base and the turned in edges of the side walls and an integral tongue extending from the base at the forward, tab entry end of the receptacle portion, the tongue extending rearwardly in inclined manner towards the turned-in edges of the side walls, the free end of the tongue at the rearward end of the receptacle portion projecting externally beyond the turned-in edges of the side walls, and the tongue within the receptacle portion being formed in a middle portion with a lance inclined rearwardly from the tongue towards the turned in edges of the side walls and arranged and adapted to engage a corresponding recess or aperture in a complementary tab when mated with the receptacle for latching the tab against withdrawal from the receptacle.

In a preferred embodiment the base of the receptacle portion is formed with a pair of longitudinal slots, one on each side of the tongue, from which slots the metal is turned up to present edges opposed to respective turned-in free edge portions of the side walls, a complementary tab mated with the receptacle being received between these opposed edges and the edges of the turned-in free edge portions of the side walls.

With the receptacle of the invention, the tongue constitutes a readily accessible release member for actuation by a finger or tool, depression of the tongue towards the base effecting release of the tongue lance from the tab aperture to allow withdrawal of the tab from the receptacle.

The invention will now be described by way of example with reference to the drawings, in which.

Figure 1:
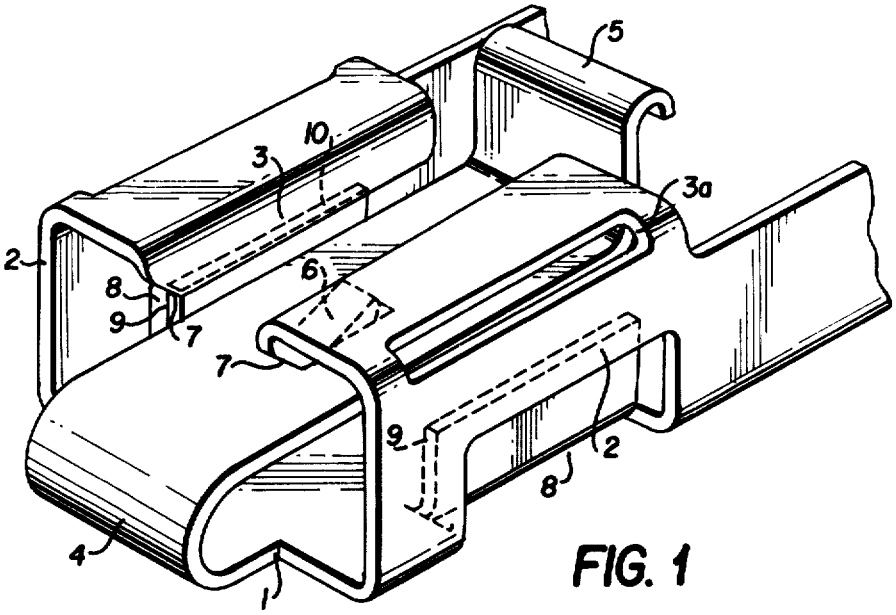
FIG. 1 is a perspective view of the receptacle portion of an electrical tab receptacle according to the invention.
Figure 2:
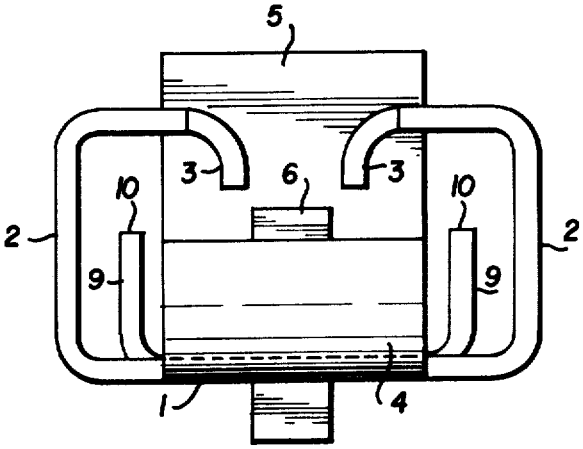
FIG. 2 is a front end view from the left of FIG. 1.

The receptacle of FIG. 1 may be formed at its right-hand end with a wire connecting portion such as a crimping ferrule of known form, not shown.

The receptacle portion of the receptacle is formed of sheet metal and is generally channel-shaped having a base 1, and upstanding side walls 2. Free edge portions 3 of the side walls 2 are turned in over the base 1 and are formed with elongate slots 3a, extending into the side walls 2 to increase the flexibility of the turned-in edge portions 3.

A tongue 4, integral with the forward end of the base 1 is turned back between the side walls 2 to extend rearwardly in inclined manner towards the turned-in edge portions 3 of the side walls 2. The tongue 4 extends beyond the rearward ends of the turned in edge portions 3, and is then turned outwards generally perpendicular to the base 1 to project externally of the receptacle portion to form a release member 5. The tongue 4 is formed in a middle portion with a pushed-up lance 6 inclined rearwardly towards the turned in edge portions 3 to present a latch for releasably engaging a complementary tab aperture as shown in and to be described with reference to FIG. 3.

Forward ends 7 of the turned in edge portions 3 are chamfered in rearwardly inclined manner towards the base 1 to facilitate tab entry. The base 1 is formed with a pair of longitudinal slots 8, one on each side of the tongue 4, and extending into the side walls 2. The metal from the slots 8 is pushed up from the base 1 to present upstanding flanges 9 with edges 10 opposed to the turned in edge portions 3.

Figure 3:
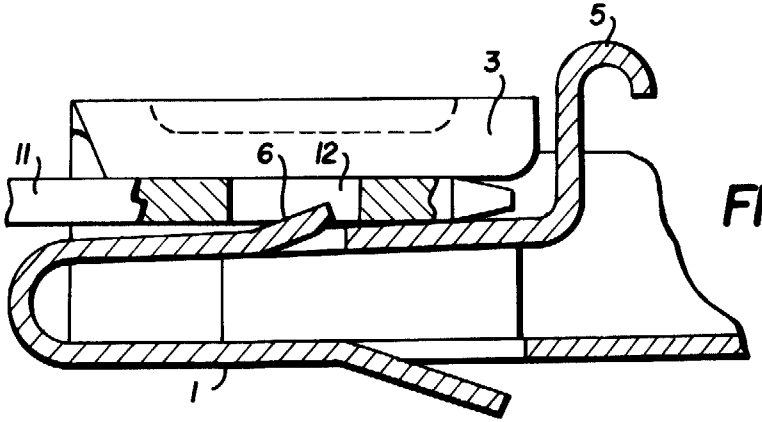
FIG. 3 is a fragmentary side view of the receptacle of FIGS. 1 and 2 mated with a complementary tab.

In use, as shown in FIG. 3, a flat tab 11 having an aperture 12 is inserted into the forward end of the receptacle, between the turned in edge portions 3 and the flange edges 10. The tab 11 depresses the tongue 4 towards the base 1, and flexes the turned in edge portions 3 to clamp the tab 11 between the edge portions 3 and the edges 10. The latch lance 6 is received in the tab aperture 12 to resist withdrawal of the tab 11 from the FIG. 3 condition. Depression of the release member 5 towards the base 1 disengages the lance 6 from the aperture 12 to permit withdrawal of the tab 11 from the receptacle.

Figure 4:
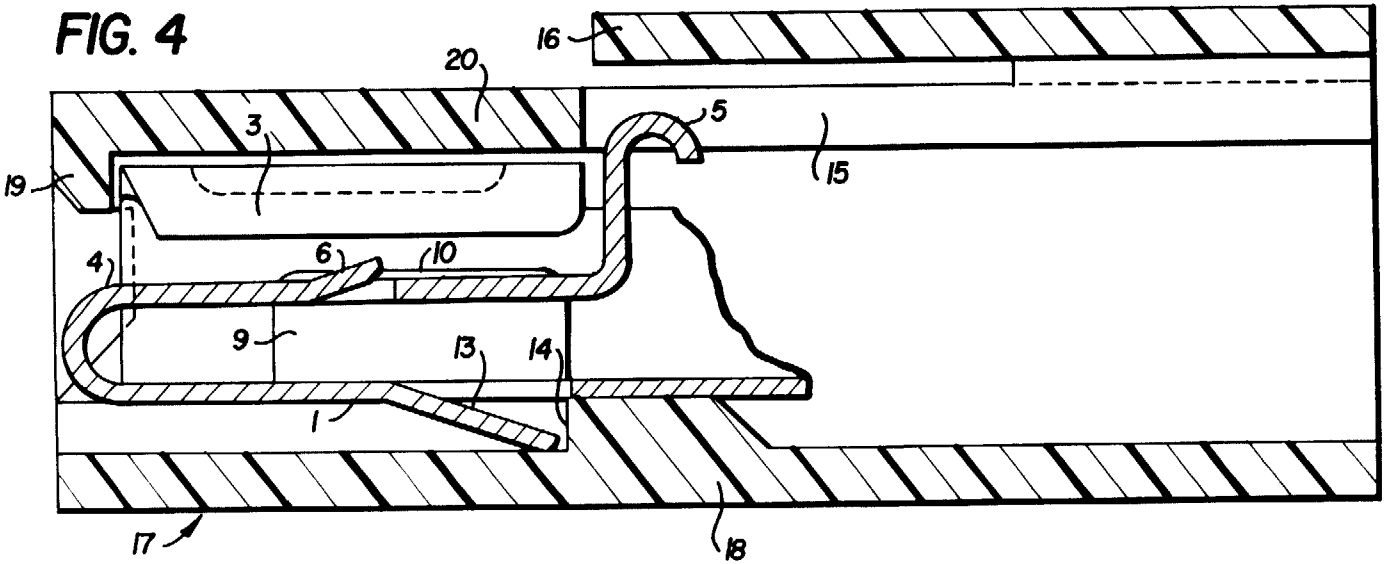
FIG. 4 is a fragmentary sectional view of the receptacle of FIGS. 1 and 2 in a first form of insulating housing.
Figure 5:
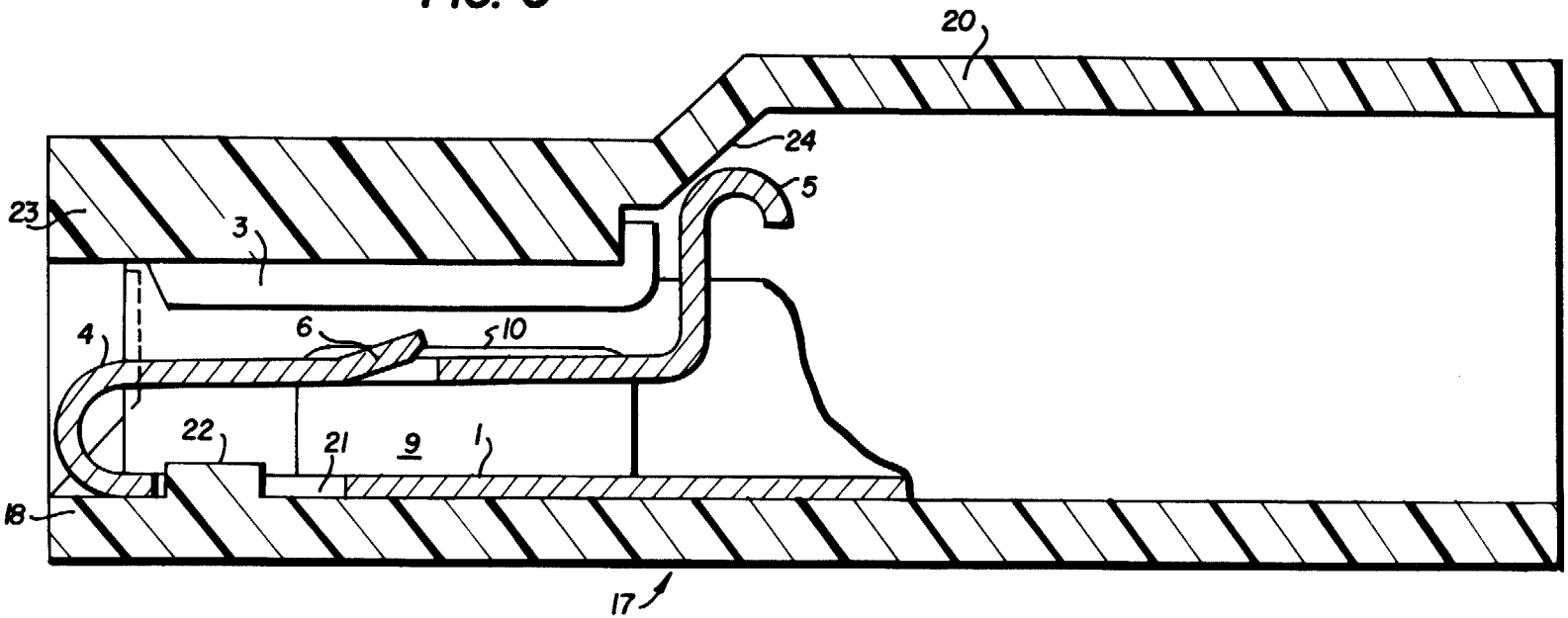
FIG. 5 is a fragmentary sectional side view of a modified form of the receptacle of FIGS. 1 and 2 in a second form of insulating housing.

The receptacle is suitably mounted in an insulating housing 17 formed of resilient insulating material such as Nylon, as shown in FIGS. 4 and 5.

In the arrangement shown in FIG. 4 a lance 13 is pushed out from the base 1 of the receptacle below the tongue 4 to extend in rearwardly and outwardly inclined manner, which lance 13 engages a shoulder 14 in the base 18 of the housing 17 in known manner.

The housing 17 is formed in its upper wall 20 with a recess 15 into which the release member 5 of the receptacle freely projects. A flexible cover portion 16 extends over the recess 15, and manual pressure on the cover portion 16 serves to flex the cover portion 16 inwardly to engage and depress the release member 5 to release a tab mated with the receptacle, as described with reference to FIG. 3.

The forward end (left-hand end in FIG. 4) of the upper wall 20 of the housing 17 is formed with a depending wall 19 which serves to prevent insertion of a tab between the upper wall 20 of the housing 17 and the receptacle, and also serves to limit axial movement of the receptacle forwardly of the housing 17. Axial movement of the receptacle rearwardly of the housing 17 is limited by the engagement between the lance 13 and the housing shoulder 14. The receptacle is thus secured within the housing.

In the arrangement shown in FIG. 5, the base 1 of the receptacle is formed with a hole 21 in which there is received a boss 22 on the base 18 of the housing 17, the relative sizes of the hole 21 and boss 22 being such that the receptacle is capable of limited movement axially relative to the housing 17.

To allow for this movement of the receptacle the depending wall 19 of the housing of FIG. 4 is omitted, and insertion of a tab between the upper wall 20 of the housing 17 and the receptacle is prevented by a longitudinal rib 23 formed centrally on the upper wall 20 of the housing 17 and extending downwardly between the turned in edge portion 3 of the receptacle, in known manner.

The upper wall 20 of the housing 17 is formed with a sloping surface 24 directed towards the release member 5, and positioned relative thereto such that forward axial movement of the receptacle relative to the housing 17 causes the release member 5 to engage the sloping surface 24 and be depressed thereby to release a tab mated with the receptacle, as described with reference to FIG. 3.

The arrangement of FIG. 5 is particularly advantageous since with a wire connected to the receptacle and a tab mated therewith, a tensile force applied to the wire in the direction away from the tab will not disconnect the receptacle from the tab since the force will not cause relative axial movement between the receptacle and its housing, but the receptacle can simply and easily be disconnected from the tab by pulling the receptacle housing in the direction away from the tab. When this is done the housing moves axially relative to the receptacle because movement of the receptacle is prevented by its engagement with the tab by way of the lance 6, and thus the sloping surface 24 of the housing 17 will engage the release member 5 and releases the receptacle from the tab. The receptacle remains secured in its housing by the engagement of the boss 22 of the housing in the hole 21 in the base 1 of the receptacle.

Although the arrangements described above comprise only a single receptacle and associated housing, it will be appreciated that a single housing can, in known manner, being formed to receive a plurality of individual receptacles. Clearly the latching feature provided by the tongue of the receptacle of the invention need be provided for only one of the receptacles in the housing, and thus the other receptacles can be conventional ones, and the housing need be provided only with means, such as the flexible cover portion of FIG. 4 or the sloping surface of FIG. 5, to release the tongue of the one receptacle. Otherwise all the receptacles can be in accordance with the invention and the housing be provided with corresponding multiple tongue release means.

I claim:

[1. An electrical tab receptacle formed from sheet metal and comprising a generally channel-shaped receptacle portion having a base and upstanding side walls with free edge portions of the side walls turned in over the base for receiving a complementary tab between the base and the turned-in edges of the side walls and an integral tongue extending from the base at the forward, tab-entry end of the receptacle portion, the tongue extending rearwardly in inclined manner towards the turned-in edges of the side walls, the free end of the tongue at the rearward end of the receptacle portion projecting rearwardly beyond the turned-in edges of the side walls, said tongue being turned outwards away from said base and projecting externally of said receptacle portion thereby forming a readily accessible release member, and the tongue within the receptacle portion being formed in a middle portion with a lance inclined rearwardly from the tongue towards the turned-in edges of the side walls and arranged and adapted to engage a corresponding recess or aperture in a complementary tab when mated with the receptacle for latching the tab against withdrawal from the receptacle.]

2. In combination, an electrical tab receptacle formed from sheet metal and comprising a generally channel-shaped receptacle portion having a base and upstanding side walls with free edge portions of the side walls turned in over the base for receiving a complementary tab between the base and the turned-in edges of the side walls, the base of the receptacle being formed with an outwardly and rearwardly directed lance, and an integral tongue extending from the base at the forward, tab-entry end of the receptacle portion, the tongue extending rearwardly in inclined manner towards the turned-in edges of the side walls, the free end of the tongue at the rearward end of the receptacle portion projecting rearwardly beyond the turned-in edges of the side walls, said tongue being turned outwards away from said base and projecting externally of said receptacle portion, and the tongue within the receptacle portion being formed in a middle portion with a lance inclined rearwardly from the tongue towards the turned-in edges of the side walls and arranged and adapted to engage a corresponding recess or aperture in a complementary tab when mated with the receptacle for latching the tab against withdrawal from the receptacle, and an insulating housing in which the receptacle is secured, a base of the housing being formed with a shoulder which is engaged by the lance on the base of the receptacle when the receptacle tends to move in one axial direction relative to the housing, and an upper wall of the housing being formed with a depending wall which prevents insertion of a complementary tab between the receptacle and the upper wall of the housing, and which is engaged by the turned-in edge portions of the side walls of the receptacle when the receptacle tends to move in the other axial direction relative to the housing, the upper wall of the housing being formed with a flexible portion which can be depressed to contact the free end of the tongue of the receptacle thereby to depress the tongue and release the lance on the tongue from a complementary tab mated with the receptacle.

3. In combination, an electrical tab receptacle formed from sheet metal and comprising a generally channel-shaped receptacle portion having a base and upstanding side walls with free edge portions of the side walls turned in over the base for receiving a complementary tab between the base and the turned-in edges of the side walls, the base of the receptacle being formed with a hole, and an integral tongue extending from the base at the forward, tab-entry end of the receptacle portion, the tongue extending rearwardly in inclined manner towards the turned-in edges of the side walls, the free end of the tongue at the rearward end of the receptacle portion projecting rearwardly beyond the turned-in edges of the side walls, said tongue being turned outwards away from said base and projecting externally of said receptacle portion, and the tongue within the receptacle portion being formed in a middle portion with a lance inclined rearwardly from the tongue towards the turned-in edges of the side walls and arranged and adapted to engage a corresponding recess or aperture in a complementary tab when mated with the receptacle for latching the tab against withdrawal from the receptacle, and an insulating housing in which the receptacle is secured, a base of the housing being formed with a boss which is received in the hole in the base of the receptacle, the relative sizes of the hole in the base of the receptacle and boss being such that the receptacle is capable of limited axial movement relative to the housing, and an upper wall of the housing being formed with a sloping surface which engages the free end of the tongue of the receptacle as the receptacle moves in one axial direction relative to the housing, whereby the tongue can be depressed to release the lance on the tongue from a complementary tab mated with the receptacle.

4. A combination as claimed in claim 3, in which the upper wall of the housing is formed with a longitudinal rib which extends between the turned-in edge portions of the side walls of the receptacle to prevent insertion of a complementary tab between the receptacle and the upper wall of the housing.

*5. An electrical connector, comprising:*

*a. a first terminal formed from sheet metal and having a conductor receiving end and an opposite channel-shaped, mating end for making electrical engagement with a complementary second terminal, a tongue on the first terminal having means thereon for releasably engaging the second terminal with the free end of the tongue being located intermediate the conductor receiving end and the mating end; and*

*b. a housing of insulating material having a passage therein in which the first terminal is located, retaining means on the housing for retaining the first terminal in the passage and for permitting limited axial movement therebetween, and release means on the housing positioned to engage the free end of the tongue*

*whereby movement of the housing relative to the first terminal causes said release means to engage the tongue free end to thereby release the first terminal from a complementary second terminal.*

*6. The electrical connector of claim 5 wherein the complementary second terminal comprises a tab and the mating end of the first terminal includes a channel-shaped, tab receiving portion.*

*7. The electrical connector of claim 6 wherein the channel-shaped, tab receiving portion of the first terminal includes a base and upstanding sidewalls with the free edge portions thereof turned in over the base for receiving the tab.*

*8. The electrical connector of claim 7 wherein the tongue is integral with the base and extends rearwardly in the space between the base and turned-in edges of the sidewalls.*

*9. The electrical connector of claim 8 wherein the tongue includes a lance protruding from its upper surface and adapted to releasably engage a recess or aperture in the tab which may be positioned between the tongue and turned-in edge portions of the sidewalls.*

*10. The electrical connector of claim 5, 6, 7, 8 or 9 wherein the first terminal has an elongated hole and the retaining means on the housing includes boss means which is received in the elongated hole.*

*11. The electrical connector of claim 5, 6, 7, 8 or 9 wherein the release means includes a sloping surface in the passage of the housing.*

*12. The electrical connector of claim 10 wherein the release means includes a sloping surface in the passage of the housing.*

*13. An electrical connector, comprising:*

*a. a receptacle formed from sheet metal and having wire receiving means at one end and a channel-shaped, tab receiving portion at another end, said portion having a base and upstanding sidewalls with the free edge portions thereof turned in over the base for receiving a complementary tab therein between, further, a tongue integral with the base and extending rearwardly in the space between the base and the turned-in edges of the sidewalls with the free end of the tongue being located beyond the ends of the turned-in edges, said tongue having a rearwardly inclined lance protruding from its upper surface adapted to engage a recess or aperture in the complementary tab for releasably latching the tab when mated in the receptacle; and*

*b. a housing for insulating material having a passage therethrough in which the receptacle is secured, means in the passage adapted to engage the receptacle to permit limited independent axial movement of the housing relative to the receptacle, further camming means in the passageway adapted to engage and depress said tongue toward the base of the receptacle as the housing is moved axially whereby*

*the lance is withdrawn from its latching engagement with the complementary tab which may be in the receptacle.*

*14. The electrical connector of claim 13 wherein the base of the receptacle has an axially elongated hole and the means in the passage of the housing includes a boss on the floor of the passage which is received in the elongated hole.*

*15. The electrical connector of claim 14 wherein the camming means includes a sloping surface in the passage in the housing.*

*16. In combination an electrical tab receptacle as claimed in claim 9, an insulating housing in which the receptacle is secured, said housing having means cooperable with the tongue of the receptacle to effect resilient depression of the tongue away from the turned-in edge portions of the sidewalls to thereby disengage the lance on the tongue from a complementary tab mated with the receptacle.*

*17. In combination, an electrical tab receptacle formed from sheet metal and comprising a generally channel-shaped receptacle portion having a base and upstanding sidewalls with free edge portions thereof turned-in over the base for receiving a complementary tab between the turned-in edge portions and an integral tongue extending from the base at the forward, tab-entry end of the receptacle portion, the free end of the tongue at the rearward end of the receptacle portion projecting beyond the rearward ends of the turned-in edge portions and thereat being turned outwardly to project away from the base, and the tongue within the receptacle portion being formed with a lance inclined rearwardly from the tongue towards the turned-in edge portions and arranged and adapted to en-*

*gage a corresponding recess or aperture in a complementary tab when mated with the receptacle for latching the tab against withdrawal from the receptacle, further the base of the receptacle being formed with an outwardly and rearwardly directed lance, and an insulating housing in which the receptacle is secured, a base of the housing being formed with a shoulder which is engaged by the lance on the base of the receptacle when the receptacle tends to move in one axial direction relative to the housing, and in upper wall of the housing being formed with a depending wall which prevents insertion of a complementary tab between the receptacle and the upper wall, and which is engaged by the turned-in edge portions of the sidewalls of the receptacle when the receptacle tends to move in the other axial direction relative to the housing, the upper wall of the housing being formed with a flexible portion which can be depressed to contact the free end of the tongue and release the lance thereon from a complementary tab mated with the receptacle.*

*18. In combination, an electrical tab receptacle formed from sheet metal and comprising a generally channel-shaped receptacle portion having a base and upstanding sidewalls with free edge portions of the sidewalls turned in over the base for receiving a complementary tab between the turned-in edge portions and an integral tongue extending from the base at the forward, tab-entry end of the receptacle portion rearwardly so that the free end of the tongue extends beyond the rearward ends of the turned-in edge portions, the free end of the tongue being turned outwards to project away from the base, and the tongue within the receptacle portion being formed with a lance inclined rearwardly from the tongue towards the turned-in edge portions and arranged and adapted to engage a corresponding recess or aperture in a complementary tab when mated with the receptacle for latching the tab against withdrawal from the receptacle, the base of the receptacle being formed with a hole, and an insulating housing in which the receptacle is secured, a base of the housing being formed with a boss which is received in the hole in the base of the receptacle, the relative sizes of the hole and boss being such that the receptacle is capable of limited axial movement relative to the housing, and an upper wall of the housing being formed with sloping surface which engages the free end of the tongue of the receptacle as the receptacle moves in one axial direction relative to the housing, whereby the tongue can be depressed to release the lance of the tongue from a complementary tab mated with the receptacle.*

19. An electrical tab receptacle formed from sheet metal and comprising a generally channel-shaped receptacle portion having a base and upstanding side walls with free edge portions of the side walls turned in over the base for receiving a complementary tab between the base and the turned-in edges of the side walls and an integral tongue extending from the base at the forward, tab-entry end of the receptacle portion, the tongue extending rearwardly in inclined manner towards the turned-in edges of the side walls, the free end of the tongue at the rearward end of the receptacle portion projecting rearwardly beyond the turned-in edges of the side walls, said tongue being turned outwardly away from said base and projecting externally of said receptacle portion thereby forming a readily accessible release member, and the tongue within the receptacle portion being formed in a middle portion with a lance inclined rearwardly from the tongue towards the turned-in edges of the side walls and arranged and adapted to engage a corresponding recess or aperture in a complementary tab when mated with the receptacle for latching the tab against withdrawal from the receptacle.

* * * * *